Feb. 15, 1966
B. GROB
3,235,877
AERATING DEVICE
Filed Nov. 8, 1962
2 Sheets-Sheet 1
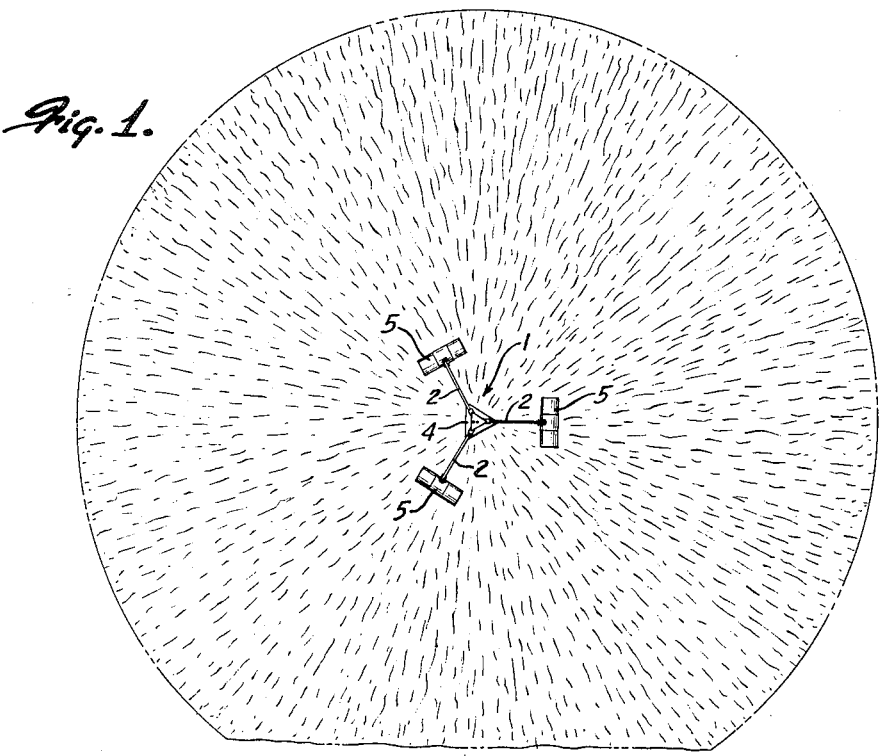
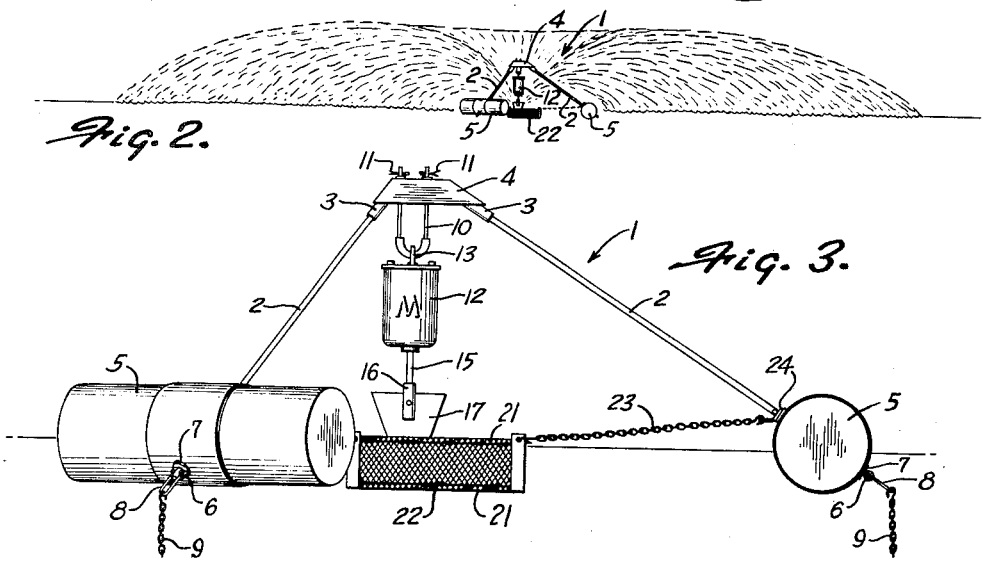
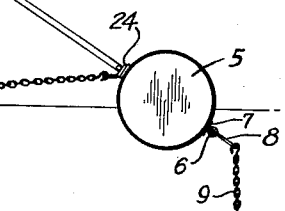
INVENTOR.
BENJAMIN GROB
BY
Andrus & Starke
ATTORNEYS

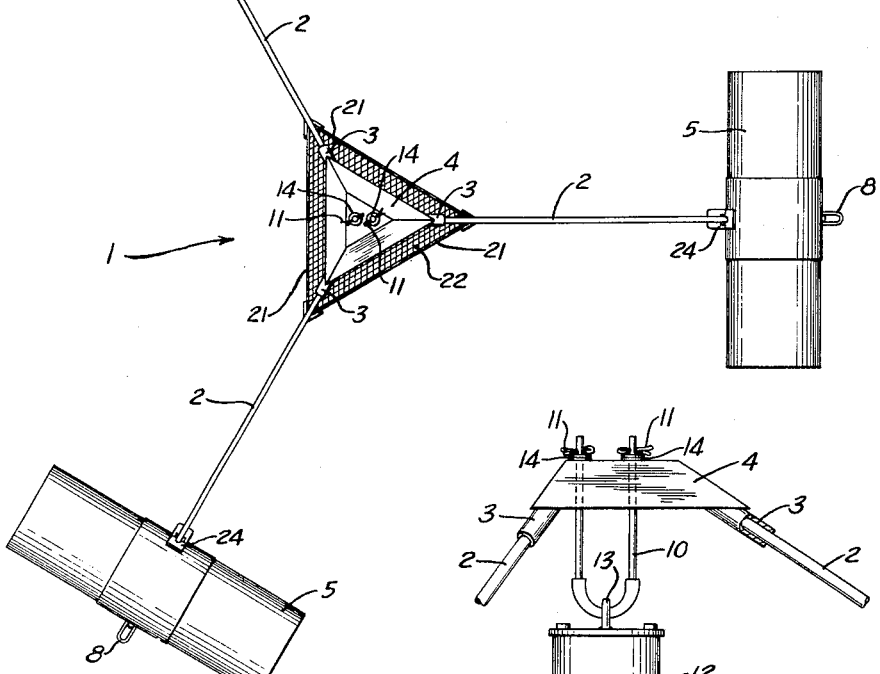

United States Patent Office 3,235,877
Patented Feb. 15, 1966

3,235,877
AERATING DEVICE
Benjamin Grob, Grafton, Wis., assignor to Grob Inc., Grafton, Wis., a corporation of Wisconsin
Filed Nov. 8, 1962, Ser. No. 236,238
9 Claims. (Cl. 239—17)

This invention relates to an aerating device and more particularly to an aerating device for aerating water in stagnant bodies of water, such as ponds or lagoons.

In stagnant ponds or other bodies of water where there is no appreciable water flow, the water will become deficient in oxygen and develop a cloudy appearance. The lack of oxygen in the water will also adversely affect the development of fish and other marine life.

The present invention is directed to an aerating device for stagnant bodies of water which diffuses oxygen into the water and maintains the water in a clear, cool condition. More specifically, the device comprises a frame which includes a series of legs each of which is connected to a float. The floats support the unit on the surface of the water and a motor is mounted on the central portion of the frame and carries a blade or agitator. The lower end of the blade is located beneath the water level and is split with one half of the blade being curved in one direction and the other half being curved in the opposite direction. Rotation of the blade by the motor results in the surface water being thrown outwardly in a large circular pattern.

Where the device is to be used in a pond containing fish or other marine life, a screen support is mounted beneath and out of contact with the rotating blade and a screen covers the support to prevent fish from contacting the rotating blades. In addition, the legs of the frame are tied into the screen support by a series of cables or chains which maintain the legs in position with respect to the frame.

The aerating device of the invention provides a generally circular pattern of water distribution. The warmer surface water is thrown upwardly and outwardly and is broken up into small droplets and thereby cooled by evaporation.

In addition, the upper portion of the blade located above the water level serves as an air fan which draws air downwardly and mixes the air with the water droplets. This mixing action provides a more effective spray pattern and introduces oxygen into the water.

The droplets being thrown outwardly by the blade form an umbrella and reflect the sun to provide an area of shade for fish and other marine life in the pond.

While the aerating device is particularly adaptable to ponds containing fish and other marine life, it can be used in any body of stagnant water where it is desired to maintain the water in a clear condition.

Other objects and advantages will appear in the course of the following description.

The drawings illustrate the best mode presently contemplated of carrying out the invention.

In the drawings:

FIG. 1 is a plan view of the apparatus showing the pattern of water distribution;

FIG. 2 is a side elevation of the apparatus showing the pattern of water distribution;

FIG. 3 is a side elevation of the apparatus;

FIG. 4 is an enlarged plan view of the apparatus;

FIG. 5 is an enlarged side elevation with parts broken away in section showing the motor and agitator blade; and FIG. 6 is an end view of the agitator blade.

The drawings illustrate an aerating device to be used in a stagnant body of water which comprises a frame 1 including three legs 2. The upper ends of the legs 2 are slidably received within tubes 3 connected to the central cap 4 of the frame, while the lower end of each leg 2 extends through an opening in a generally cylindrical float 5. The floats 5 are retained on the legs 2 by bolts 6 which extend through holes in the ends of the legs. A washer 7 is disposed around each leg and bears against the surface of the float 5.

To anchor the device in the pond, a yoke 8 is connected to each bolt 6 and an anchor chain 9 is connected to one or more of the yokes. The anchor chain 9 is adapted to be attached to an anchor or other fixed object, not shown, to prevent movement of the device on the surface of the water.

A U-shaped yoke 10 is suspended from the cap 4 and the upper ends of the yoke 10 are prevented from sliding out of the cap by cotter pins 11 which pass through suitable openings in the arms of the yoke. Yoke 10 is adapted to support a motor 12, and the yoke passes through a ring 13 secured to the upper end of the motor. The motor 12 is connected to a suitable source of electrical power by power lines, not shown.

The height of the motor with relation to the water level can be adjusted by the use of a series of shims 14 which are disposed around the arms of the yoke on top of the cap 4. By increasing or decreasing the number of shims 14, the motor can be raised or lowered with respect to the water level.

The drive shaft 15 of the motor is connected within a sleeve 16 attached to the central portion of an agitator blade 17. As best shown in FIG. 5, the blade 17 is generally trapezoidal in shape, with the side edges diverging upwardly and outwardly from the generally straight bottom edge. The bottom edge is provided with a slot 18 and the lower edge portion of the blade on one side of the slot, indicated by 19, is bent or curved in one direction while the portion of the lower end of the blade on the opposite side of the slot, indicated by 20, is curved in the opposite direction, as best shown in FIG. 6.

Rotation of the motor drive shaft 15 rotates the blade 17. The bent edges 19 and 20 of the blade are located slightly beneath the water level and rotation of the blade will cause the bent edges 19 and 20 to scoop up water which is thrown outwardly by centrifugal force in the form of fine droplets throughout a generally circular pattern, as best shown in FIGS. 1 and 2. The yoke 10, which supports the motor 13, permits the motor to hang vertically at all times even though the entire apparatus may bob up and down due to water conditions. However, the connection of the yoke 10 to the cap 4 prevents rotation of the motor.

In some instances, where the apparatus is to be used in a pond or lagoon containing fish or other marine life, it is desirable to screen the agitator blade 17 so that the fish do not contact the blade. As best shown in FIGS. 3 and 4, a generally triangular support 21 is located outwardly of the blade and a screen 22 or other perforated material is located over the frame. The screen 22 extends horizontally across the lower edges of the support and vertically above the water level to provide a protective shield for the blade 17.

The screen support 21 is connected to the lower end of each of the legs 2 by chains or cables 23. One end of each cable is connected to the support 22 and the other end of the cable is connected to a bracket 24 located on the legs 2. The chains or other connecting members 23 serve to draw the legs inwardly and prevent the upper end of the legs from sliding out of the tubes 3.

The present invention is a simple and inexpensive device for providing very effective aeration of a stagnant pond or lagoon. The device can be readily assembled and disassembled without the use of bolts or other fastening members which could become rusted during use. The entire unit can be disassembled by merely loosening the chains 23 and withdrawing the legs 2 from the tubes 3. The motor is readily disconnected from the frame by removal of the cotter pins 11 which connect the yoke 10 to the cap 4.

The lower bent edges 19 and 20 of the blade 17 serve to scoop up the surface water and centrifugal force moves the water laterally across the blade and throws it outwardly in the form of fine droplets. In conjunction with this, the upper portion of the blade 17 which is located above the water level draws air downwardly and this air is mixed with the water droplets to provide more effective aeration of the water.

The warm surface water is broken up and thrown outwardly by the blade, which tends to reduce the overall temperature of the water. As shown in FIGS. 1 and 2, the water is distributed uniformly from a location adjacent floats 5 to the periphery of the circular pattern and forms an umbrella or area of shade which is beneficial to fish and other marine life.

Various modes of carrying out the invention are contemplated as being within the scope of the following claims particularly pointing out and distinctly claiming the subject matter which is regarded as the invention.

I claim:

1. An aerating device for stagnant bodies of water, comprising a frame including a central member, float means, a series of legs connected to the central member and extending downwardly and outwardly therefrom and attached to the float means, a motor swingably supported from the central member and having a depending drive shaft, and an agitator blade secured to the drive shaft with the lower portion of the blade being disposed beneath the water level, and being disposed to rotate and throw the water outwardly in the form of fine droplets.

2. An aerating device for stagnant bodies of water, comprising a frame including a central member, a series of tubular members secured to the central member and extending downwardly therefrom, a leg slidably received within each of said tubular members, a float connected to the lower end of each leg and serving to support the frame above the water level, a motor swingably supported from the central member and having a depending drive shaft, an agitator blade secured to the drive shaft with the lower portion of the blade being disposed beneath the water level and being disposed to rotate and throw the water outwardly in the form of fine droplets, a perforated shield disposed laterally outward of the agitator blade and extending beneath the blade to prevent marine life from contacting the blade, and connecting means interconnecting the shield and the legs to prevent displacement of the legs from said tubular members.

3. An aerating device for stagnant bodies of water, comprising a frame including a central member, a series of tubular members secured to the central member and extending downwardly therefrom, a leg slidably received within each of said tubular members, a generally cylindrical float for each of said legs, each leg passing transversely through the respective float with the lower end of the leg projecting outwardly of the float, an anchor member secured to the lower end of at least one of said legs to anchor the device with respect to the body of water, a motor swingably supported from the central member and having a depending drive shaft, and an agitator blade secured to the drive shaft with the lower portion of the blade being disposed beneath the water level and the upper portion disposed above the water level, said blade disposed to rotate and throw the water outwardly in the form of fine droplets.

4. An aerating device for use with a body of water, comprising a frame, float means connected to the frame for supporting the frame above the water level, a motor mounted on the frame and having a downwardly extending drive shaft, and a generally vertical paddle secured to the drive shaft and having a lower portion disposed beneath the water level and having an upper portion disposed above the water level, said paddle including a first blade member located at the lower end of the paddle and curved outwardly in one direction and including a second blade member located at the lower end of the paddle and being curved outwardly in the opposite direction from said first blade member.

5. The structure of claim 3 in which the agitator blade is generally flat and is provided with a vertically extending slot dividing the lower end of said blade into a pair of water throwing members, one of said water throwing members being bent laterally in one direction and the other water throwing member being bent laterally in the opposite direction.

6. The structure of claim 3 in which the agitator blade is substantially flat and has a generally trapezoidal shape with the side edges extending upwardly and outwardly from the bottom edge, said bottom edge having a slot disposed in vertical alignment with the drive shaft and dividing the lower end of said blade into a pair of water throwing members, one of said water throwing members being bent laterally in one direction while the other of said water throwing members being bent laterally in the opposite direction.

7. An aerating device for stagnant bodies of water, comprising a frame including a central cap, a series of legs connected to the central cap and extending downwardly and outwardly therefrom, a float connected to the lower end of each leg and serving to support the frame above the water level, a yoke connected to the cap and extending downwardly therefrom, a motor having a downwardly extending drive shaft, means for swingably supporting the motor from the yoke, and an agitator blade secured to the drive shaft of the motor with the lower portion of the blade being disposed beneath the water level and the upper portion of the blade disposed above the water level, said blade disposed to rotate and throw the water outwardly in the form of fine droplets.

8. An aerating device for bodies of water, comprising a tripod frame including a central cap and three legs extending downwardly and outwardly from said cap, a float connected to the lower end of each leg and serving to support the frame above the water, a motor supported from the central cap and having a depending drive shaft, an agitator blade secured to the drive shaft with the lower portion of the blade being disposed beneath the water level and the upper portion of the blade disposed above the water level, said blade disposed to rotate and throw the water outwardly in a generally circular pattern, a triangular screen support disposed laterally outward of the agitator blade, and a screen carried by the screen support and extending beneath the blade and upwardly over the support to a position above the water level to prevent marine life from contacting the blade.

9. The structure of claim 8 including a flexible member interconnecting each corner of the triangular screen support with one of said legs to prevent displacement of the legs from the central cap.

References Cited by the Examiner

UNITED STATES PATENTS

| 1,332,992 | 3/1920 | Moore et al. | 248—191 X |
| 1,674,493 | 6/1928 | Adams | 248—191 X |
| 2,194,037 | 3/1940 | Thuma. | |
| 2,318,141 | 5/1943 | Collins | 259—108 |
| 2,364,686 | 12/1944 | Balisteri et al. | 43—57 |
| 2,678,512 | 5/1954 | Maston. | |
| 2,814,057 | 11/1957 | Burns | 9—8 |

FOREIGN PATENTS 1,205,301  8/1959  France.

HARRY B. THORNTON, *Primary Examiner.*

RONALD R. WEAVER, *Examiner.*